United States Patent Office 2,741,296
Patented Apr. 10, 1956

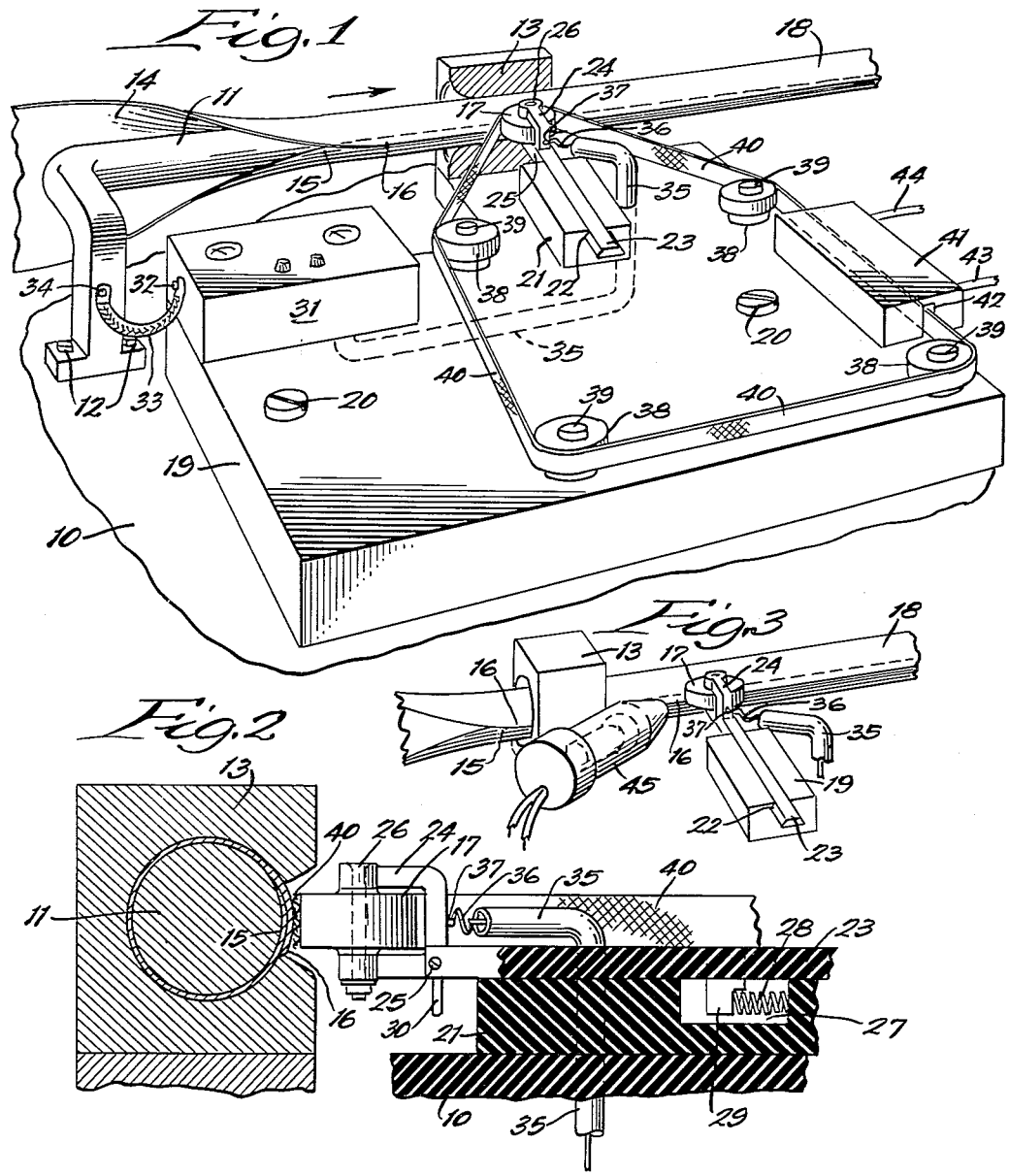

2,741,296

APPARATUS FOR HEAT-SEALING OVERLAPPING SURFACES OF PLASTIC MATERIAL

Fred V. Collins, Des Plaines, Ill., assignor to William F. Stahl, Kenilworth, Ill.

Continuation of abandoned application Serial No. 35,225, June 25, 1948. This application April 20, 1953, Serial No. 349,879

5 Claims. (Cl. 154—42)

This invention relates to a method of sealing organic plastics and to apparatus for performing the same; in particular it is concerned with a method and means for employing heat, in the presence of a high-frequency electric field, to fuse and seal together adjoined surfaces of plastic material and especially plastics having low dielectric loss factors.

This application is a continuation of my copending application, Serial No. 35,225, for Method and Apparatus for Sealing Plastics, filed June 25, 1948, now abandoned.

High-frequency fields have in the past been extensively employed in industrial applications as a means of rapidly heating materials for treatment. When a material is placed in an electric field which is alternating at high frequency, the molecules in the material tend to reverse their orientation during each electrical cycle in accordance with the changes in polarity of the field. A certain amount of molecular friction opposes this periodic reorientation, and as a result a part of the energy in the electric field is dissipated in the material in the form of heat. Energy so lost from an electric field is commonly called "dielectric loss." The magnitude of dielectric loss varies greatly from one material to another; in many applications, and for high-frequency insulation in particular, materials with the lowest possible dielectric loss properties are desired.

In recent years certain plastic substances, such as polystyrene and polyethylene, have been developed which have extraordinarily low dielectric loss factors; in fact, dielectric losses in such materials are negligible in electric fields having frequencies up to several thousand megacycles per second.

In fabricating tubes and other articles of manufacture from plastic sheet stock, it is old to seal adjoining surfaces together by passing the surfaces under mechanical pressure through a high-frequency electric field. In the prior-art processes, dielectric losses in the plastic material raised its temperature beyond the melting point and effected a fusion or sealing of the adjoining surfaces. The plastic materials available at the time this technique came into general use possessed dielectric loss factors which were relatively high by modern standards, and the necessary heating could readily be accomplished with an electric field of moderate power and frequency.

With the development of modern low-loss plastics, however, the use of radio-frequency heating to effect sealing thereof has become increasingly difficult and expensive. Even though the energy required to heat the plastic to its fusion temperature might be only a hundred watts or less, radio-frequency generators developing a peak power of many kilowatts have been required, for the reason that such a minute fraction of the energy in the field is dissipated as dielectric loss in a modern, low-loss plastic. Moreover, satisfactory sealing by the old processes have, with the new low-loss plastics, required radio-frequency generators of much higher frequencies than those which were satisfactory with the older materials having higher loss factors.

Attempts to use other methods of heating as a means of fusing the low-loss plastics, however, have been generally unsatisfactory. Among such methods is the heating of the plastics to bring about a fusing thereof which has been successful where the plastic materials have a high dielectric loss factor. However, where the plastic material is polystyrene or polyethylene or a similar plastic material having a low dielectric loss factor, it is not feasible to fuse such materials to provide a sealing thereof by the application of external heat and pressure. In materials such as these, heat of sufficient magnitude to bring the plastics to the melting point may be employed but effective sealing does not result. Rather, the plastic material becomes gummy and sticky and there is a general deterioration thereof, but a fusing of the material does not accompany such heating. In fact, it is virtually impossible to bring about a fusing of plastic materials having low dielectric loss factors to produce a sealing between lapped layers by the application of heat from an external source.

This invention contributes a new means and method for sealing plastic surfaces together; by the method of this invention a strong, well-integrated seal is obtained, even in the lowest-loss materials; and the necessity for very high-powered generators, operating at super-high frequencies, has been done away with.

I have discovered that when plastic materials having low dielectric loss factors are heated by an external source, there is a change in the characteristics of the material and the dielectric loss factor increases considerably as the material is heated. This discovery enables me to use a radio-frequency field to produce a fusion and sealing of plastics having low-loss dielectric factors. Such materials may be first heated by any suitable external source to raise the temperature thereof and bring about an increase in the dielectric loss factors of the material so that the plastic material may then be subjected to a radio-frequency field which will be operative upon plastic in view of the increase in the dielectric loss factor thereof to bring about a fusion and sealing of the plastics.

Accordingly, an object of this invention is to provide a method of fusing together plastic materials which provides an excellent union therebetween and that is especially applicable for the sealing of plastic materials having low dielectric loss factors. Another object of the invention is to provide a method of sealing plastic materials having low dielectric loss factors by the combined use of an external heating source and a radio-frequency field and wherein the radio-frequency field in itself would be of insufficient frequency and power to effectuate a sealing of the material and wherein the sealing by an external heat source alone could not be accomplished. Still another object of the invention is to provide apparatus for heat-sealing plastics having low dielectric loss factors. A further object of the invention is to provide a method and apparatus for heat-sealing plastic materials having low dielectric loss factors and in which the plastic is heated by an external source to bring about a change in the dielectric loss factor thereof of sufficient magnitude to enable a radio-frequency electric field to operate successfully upon the plastic to bring about a heat sealing thereof. Additional objects and advantages will appear as the specification proceeds.

The accompanying drawings disclose a practical embodiment of the invention, in two alternative forms, as applied to the art of making tubing from plastic sheet stock. Of the drawings, Figure 1 is a perspective view of one form of the invention; Fig. 2 is a sectional view of certain of the important components of the Fig. 1 embodiment; and Fig. 3 is a fragmentary perspective view showing one modification of the apparatus of Fig. 1.

In the illustration shown, 10 designates a supporting table, which may be of steel or other material having considerable mechanical strength and rigidity. A mandrel 11 is rigidly bolted to table 10 by bolts 12. A die 13 is likewise supported rigidly on table 10 by any suitable means and is positioned to cooperate with mandrel 11 to effect folding of plastic sheet stock 14 so as to form a tube fitting snugly around the mandrel and having overlapping edges 15 and 16.

The overlapping edges 15 and 16 are fused together as they pass roller 17 and therebeyond a single, integrated tube 18 moves down the mandrel and off the end thereof. Any suitable means (not shown) may be employed to move the tubing 18 along mandrel 11. Similarly, a supply of sheet stock 14 may be fed continuously to the sealing apparatus from a drum or other suitable container (not shown).

A block of insulating material 19 rests on and is securely affixed to table 10 in front of mandrel 11. In the illustration shown block 19 is bolted to table 10 by bolts 20. On the top of block 19, near mandrel 11 and directly opposite die 13, a second block of insulating material 21 is rigidly affixed by any suitable means to block 19.

The upper surface of block 21 has a channel 22 extending through block 21 at right angles to mandrel 11. Slidably fitted into channel 22 is a member 23 which carries at its end adjacent mandrel 11 a U-shaped journal bearing 24. Bearing 24 is secured by bolt 25, or any other suitable means, into a recess on the end of member 22, and is supported as shown with its open arms extending toward mandrel 11. The open arms of bearing 24 are bored to receive axle bolt 26. Axle bolt 26 carries roller 17 rotatably mounted thereon.

Block 19 contains a longitudinal recess 27 in the floor of channel 22, and mounted therein is a coil spring 28. Spring 28 cooperates with a downward projection 29 on member 23 to urge member 23 toward mandrel 11. A projection 30 extending downward a short distance from bearing 24 serves as a stop to prevent member 23 from being pulled backward therebeyond.

A high-frequency alternating-current generator 31 is mounted on block 19. The characteristics of generator 31 may be varied within wide limits; in a typical case it might have a power capability of 300 to 400 watts and a frequency of about 200 megacycles per second. A ground terminal 32 on the cabinet of generator 31 is connected by a bus 33 to terminal 34 on mandrel 11. A coaxial line 35 runs from generator 31 to a point near journal bearing 24, and a flexible conductor 36 connects the central conductor of coaxial line 35 to terminal 37 on bearing 24.

A plurality of rollers 38 are mounted for rotation in a horizontal plane above block 19 by means of axle bolts 39, and an endless belt 40 is connected around roller 17 and rollers 38. Spring 28 places belt 40 under tension and causes it to press against the overlapping edges 15 and 16 of the plastic folded around mandrel 11. As the plastic tube moves along the mandrel, the frictional contact between it and belt 40 causes belt 40 to move in its path around the rollers.

Belt 40 may be made of any material having relatively high dielectric loss properties and able to withstand temperatures higher than the melting point of the plastic being fused. For example, in practical embodiments of the invention I have found that satisfactory results may be obtained by using a belt made of woven cotton, canvas, wool, or an acetate fabric.

On block 19, between a pair of the rollers 38, a cooling box 41 is placed in the path of movement of belt 40, and belt 40 passes through cooling box 41, entering box 41 through a slot 42 in the end thereof, and leaving through a similar slot (not shown) in the opposite end of the box 41. Cooling box 41 may accomplish cooling of belt 40 by any suitable means; for example, a coil in which refrigerant is circulated may chill the air within box 41 and thereby reduce the temperature of belt 40. In the drawing conduits 43 and 44 are shown, by way of example, as inlet and outlet channels for the refrigerant.

The operation of the embodiment of the invention shown in Figs. 1 and 2 is as follows. The plastic material having a low dielectric loss factor is formed about the mandrel 10 so that the edges 15 and 16 thereof are overlapping. The tube thus formed advances along the mandrel 11 and the lapped edges 15 and 16 move along the belt 40 and roller 17. The radio-frequency generator 31 produces between the roller 17 and mandrel 11 a strong high-frequency electric field. Since belt 40 is made of a material having relatively high dielectric loss properties, it is heated by the radio-frequency field to a high temperature almost instantaneously and the heat of the belt 40 is communicated by direct conduction to the lapped edges 15 and 16 of the plastic tube. The temperature of the plastic rises by contact with the belt 40 and the increase in temperature of the plastic is effective to bring about a change in the dielectric loss factor thereof. Actually the change is an increase in the dielectric loss factor. The lapped edges 15 and 16 are preferably not heated to the point where the material becomes gummy and sticky and would tend to cling to the belt 40 and to be extruded by the pressure of the belt and roller 17 against the edges. On the other hand, it is preferable to raise the temperature of the lapped edges 15 and 16 as high as possible within the limits set out, because the greater the increase in the temperature of the plastic the greater is the increase in the dielectric loss factor of the material. An increase in the dielectric loss factor is desirable for it permits the use of a radio-frequency generator 31 that does not have an excessively high frequency and that does not need to have a large power output.

Substantially simultaneously with the heating of the lapped edges 15 and 16 by physical contact with the heated belt 40 the radio-frequency field produced by the generator 31 is present between the roller 17 and the mandrel 11. The radio-frequency field present between the roller and mandrel is effective to bring about a fusion or hot-sealing of the lapped edges 15 and 16 since the dielectric loss factor thereof has been increased by the application of heat to these edges from an external source to a point where the radio-frequency field is effective to heat the edges to the sealing temperature thereof. The newly formed unitary tube 18 then moves on down and off of the mandrel 11 after passing roller 17. The belt 40 after passing around roller 17 and being heated passes over the rollers 38, deriving from such movement a certain amount of air cooling, and then it passes through cooling box 41 where its temperature is reduced further.

If the material being used for belt 40 is not affected by high-temperature operation, the air cooling received by the belt in its journey around rollers 38 may be sufficient, in which case cooling box 41 may be dispensed with.

If the invention is being used with plastics having low fusing temperature, and if a high heat-resistant material be employed for belt 40, rollers 38 and cooling box 41 may be eliminated entirely, and belt 40 may be reduced in size so that it simply surrounds roller 17 like a tire. If this be done, care must be taken to adjust the intensity of the electric field to a level which will heat belt 40 adequately without causing it to burn or otherwise deteriorate.

Figure 3 shows a modification of the invention in which the heat required for fusion of the plastic is provided by an electric heating element. For convenience, the elements are numbered in Fig. 3 with the same numerals as in Figs. 1 and 2, to the extent that the elements are equivalent. Fig. 3 shows mandrel 11 and die 13, operative to fold the plastic sheet 14 into a tube with overlapping edges positioned to be engaged by roller 17. In this embodiment of the invention, however, die 13 is situated along the mandrel 11 upstream of roller 17. Roller 17 is supported and provided with high-frequency energy in manner identical to the embodiment of Figs. 1 and 2; in this form of the invention, however, belt 40 is not used, and roller 17 rolls in direct contact with the plastic tube on mandrel 11. Adjacent block 19 an electric heating element 45 is positioned by any suitable means (not shown) so as to focus its infra-red radiation onto roller 17 and the overlapping plastic edges 15 and 16.

In operation of the embodiment illustrated in Fig. 3, the infra-red radiation from heating element 45 being directed against the lapped edges 15 and 16 of the plastic material brings about an increase in the temperature of these edges. The temperature increase is operative to increase the dielectric loss factor of the plastic material to a point where the radio-frequency field produced by the relatively low-frequency and low power radio-frequency source 31 is effective to heat-seal the lapped edges as they pass between the roller 17 and mandrel 11. This form of the invention has the substantial advantage of requiring even less radio-frequency power than the embodiment of the invention shown in Figs. 1 and 2. It is, however, somewhat more critical in adjustment since it is important that the heat be applied to the plastic at the place and time, or as nearly thereto as is possible, that it is passing through the electric field.

The described method and apparatus is effective for heat-sealing plastics having low-loss dielectric factors and in which the heat-sealing of such material cannot successfully be brought about solely by the application of heat to lapped edges of the material from an external source. That is to say, the material cannot be successfully sealed by simply heating lapped edges by conduction through contact with a body having an elevated temperature or by infra-red radiation. Similarly, plastics of this character having low dielectric loss factors cannot be heat-sealed by subjecting the material to a radio-frequency field unless the frequency of the field is so high and the power produced by the radio-frequency generating source is so high that the costs and complexity of the required equipment are prohibitive. I have combined these two separate procedures—namely, heating the plastic by subjecting it to heat from an external source and at substantially the same time subjecting the material to a relatively low-frequency low power radio-frequency field. The use of both procedures is effective to bring about a strong union between lapped edges of the plastic when neither of the procedures alone could accomplish this result. The result achieved by the use of the external heating source and the radio-frequency field is not merely cumulative but rather the radio-frequency field actually produces a fusion and heat-sealing of the materials and is operative to do so because of my discovery that by heating the plastic from an external source a change in the dielectric loss factors thereof is attained, the change actually being an increase in the dielectric loss factor and the increase being related to the frequency and strength of the electric fields so that the field is operative to fuse the plastic and seal the same. In one form of the invention the heating from an external source and subjection to the radio-frequency field is substantially simultaneous, while in the modified form the heating of the plastic leads slightly the subjection of the same to the radio-frequency field. Preferably the heating and passing through the radio-frequency field should be substantially simultaneous and in no case should the heating of the material from an external source lag the subjection of the material to the radio-frequency field.

While I have herein illustrated and described certain embodiments of my invention in considerable detail for purposes of illustration, it will be understood that many modifications can be made therein by persons skilled in the art without departing from the spirit of my invention.

I claim:

1. In apparatus for sealing together overlapping surfaces of plastic material having a relatively low dielectric loss factor, a support mandrel adapted to hold the surfaces to be joined in overlapping relation, an endless belt of a material having a relatively high dielectric loss factor entrained for movement about a predetermined path of travel, a roller bearing against said belt and being biased to urge the same into engagement with overlapped surfaces of a material held by said support mandrel, and means including a relatively high frequency generator for applying a relatively high frequency electric field between said roller and support mandrel.

2. The structure of claim 1 in which means are provided in the path of travel of said belt for cooling the same after it has passed through said electric field.

3. In apparatus for sealing together overlapping surfaces of a plastic material having a relatively low dielectric loss factor, a support mandrel adapted to support material moving therealong with the surfaces to be joined positioned in overlapping relation, a belt supported for movement along a predetermined path of travel and being heated in one area thereof, a roller bearing against said belt in the heated area thereof to urge the same into engagement with overlapped surfaces of a material moving along said support mandrel, and means including a relatively high frequency generator for applying a relatively high frequency electric field between said roller and support mandrel.

4. In apparatus for sealing together overlapping surfaces of a plastic material having a relatively low dielectric loss factor, a support mandrel adapted to support material moving therealong with the surfaces to be joined positioned in overlapping relation, an endless belt entrained for movement along a predetermined path of travel, means for heating a portion of said belt, a roller bearing against said belt in a heated area thereof to urge the same into engagement with overlapped surfaces of a material moving along said support mandrel, and said means comprising an electric generator for applying a relatively high frequency electric field between said roller and support mandrel.

5. In apparatus for sealing together overlapping surfaces of a plastic material having a relatively low dieletric loss factor, a support mandrel adapted to support material moving therealong with the surfaces to be joined positioned in overlapping relation, a belt supported for movement along a predetermined path of travel and being formed of a material having a relatively high dielectric loss factor, a roller bearing against said belt and being biased to urge the same into engagement with overlapped surfaces of a material moving along said support mandrel, and an electric generator for applying a high frequency electric field between the roller and support mandrel through said belt and the overlapped surfaces of a material moving along said support mandrel.

References Cited in the file of this patent

UNITED STATES PATENTS

| 2,388,824 | Brown | Nov. 13, 1945 |
| 2,457,659 | Graham et al | Dec. 28, 1948 |
| 2,479,290 | Auxier et al. | Aug. 16, 1949 |
| 2,570,921 | Collins | Oct. 9, 1951 |